May 29, 1951 E. G. HUZENLAUB ET AL 2,555,235
PROCESS FOR TREATMENT OF CEREALS
Filed March 23, 1945
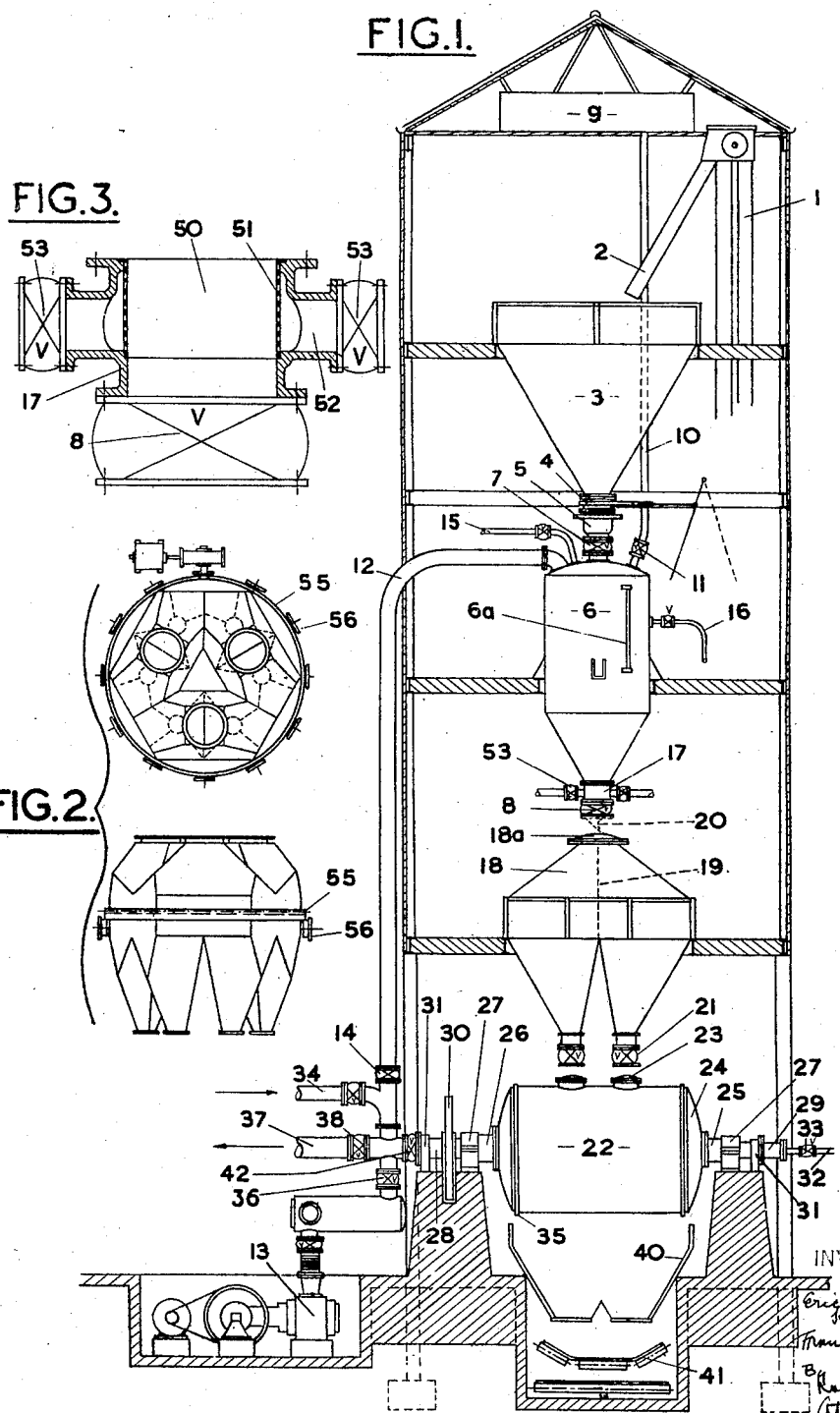
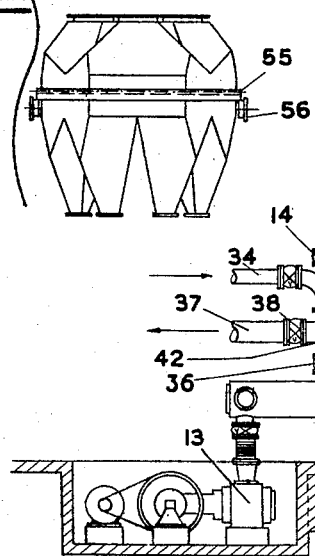
INVENTORS Patented May 29, 1951

2,555,235

UNITED STATES PATENT OFFICE 2,555,235

PROCESS FOR TREATMENT OF CEREALS

Erich Gustav Huzenlaub, Brentford, and Francis Heron Rogers, Elmhurst, Kenley, England, assignors, by direct and mesne assignments, to Mars and Huzenlaub, Chicago, Ill., a copartnership Application March 23, 1945, Serial No. 584,300
In Great Britain June 9, 1944

11 Claims. (Cl. 99—80)

This invention relates to a new or improved process for the treatment of cereals prior to milling, or applied to cereals such as rice, barley and oats that are partaken as food and are only partly milled.

The object of the invention is to cause the vitamin bodies present in the whole grain, with or without the husk, to be absorbed by the endosperm or starch bodies of the grain together with a proportion of those parts of elementary salts, sugars and fats, which are water soluble.

A further object of the invention is to increase by enzymic action the digestibility and assimilation of the finished product and to produce the latter with superior keeping properties, taste and appearance.

Heretofore cereal products such as milled white flour, milled rice, pearl barley and kindred grain, which is stripped of its germ, its cuticle, aleurin layers and other outer coverings have only a negligible quantity of vitamins, natural salts and other like desirable qualities present. In such form their nutriment and health-protecting values are very low.

In Eastern countries, rice, which is the staple diet of those lands, has perforce been parboiled to lessen beriberi, pellagra and other diseases originating from lack of the protective factors in milled rice. In immediately later years a process of conversion has been applied to cereals to increase the retention of vitamins in the milled grain. Such process of conversion produces additionally a physical change of state in the starch matter of the endosperm in that the starch particles are without voids having a continuous interadhesive structure and are therefore translucent and the grain after drying is hard, lustrous and insect resistant with greatly increased keeping and cooking qualities.

The present invention relates to an improved type of conversion process applicable to rice, wheat, barley, oats and kindred cereals wherein not only is the endosperm of the grain product enriched by vitamins, the natural seat of which is in the surface layers of the original product, but is also made more digestible and easy of assimilation, this step being principally achieved by permitting the natural enzymes present to react catalytically upon the compounds inherent to the grain under controlled conditions for maximum reaction, whereby the final product retains up to 80% of the vitamins present in the whole grain, and is an easily assimilable food product.

The invention consists in a method of and means for converting and enriching the endosperm of cereal grain and comprises the steps of placing the grain in a closable vessel, creating a high vacuum therein to pre-empty the voids and capillary spaces of the endosperm of air, of admitting warm steeping water to said vessel, whilst maintaining said vacuum during a period to create an instantaneous influx to the said voids of a solution of the vitamins and like soluble bodies, of applying heat and pressure within said steeping vessel for a further period of time until penetration and osmosis is complete, of permitting enzymic action to ensue for a prolonged period and then of further treating the grain with live steam above atmospheric pressure to gelate or convert the starch, and then suddenly releasing said steam with its entrained volatile bodies and their odours and drying the grain prior to milling or packetting for sale.

In order that the invention shall be better understood reference is made to the accompanying drawing wherein a preferred practical embodiment of the invention is shown and wherein:

Fig. 1 is an elevation of plant for carrying out the process of the invention,

Fig. 2 shows in plan and elevation a multi-compartmented rotary enzyme reaction chamber, Fig. 3 shows detail of separating drain at base of steeping vessel.

Referring to the drawings and to Fig. 1 the raw material which preferably is a cleansed grain free of withered or insect hollowed kernels, is raised to the top floor of a gravity flow grouping of plant units by means of an elevator 1, having a chute 2 delivering the raw material to a receiving bin 3. Beneath the bin 3 is a shutter valve 4 and a funnel device 5. The orifice from the funnel 5 is situated above the steeping tank 6, said tank 6 being capable of isolation by means of an upper valve 7 and lower valve 8. The steeping tank 6 is designed to contain a batch of raw material for treatment such, for instance, as a quantity of 10 tons, and is connected to a warm water supply from a superimposed tank 9 through conduit 10 and valve 11. The said steeping tank is also connected by conduit 12 to a vacuum pump 13, the said conduit being capable by isolation from said tank 6 by valve 14. A compressed air service is also admitted to the tank 6 by conduit 15 and a low pressure steam supply through conduit 16 from any convenient source is desirable to maintain temperature of the steeping liquor in cold weather or climates.

As the base of the steeping tank 6 is a draining valve collar 17 more particularly described under Fig. 3. Beneath the steeping tank 6 is situated the enzyme reaction chamber 18 closable by a hinged lid or the like 18a, said chamber 18 being adapted to receive the whole batch content of the steeping tank 6 or divided into two portions by a separating plate shewn in dotted lines at 19, Fig. 1, providing two compartments, in which case each is equal to the contents of the steeping tank 6. If two such chambers 18 are provided a diverting chute 20 shewn in dotted lines is provided from the base of the steeping tank 6 given access to one or other of chambers 18 of the treated contents of the steeping tank 6. The enzyme chamber or chambers 18 are closable at their base by valves 21. Disposed below the enzyme chamber or chambers 18 is a digesting and drying machine 22 hereinafter referred to as a drying machine having removable loading covers 23. Said drying machine is a steam jacketted cylinder having steam tubes traversing its interior and having terminal dished end plates 24. The said end plates 24 are fitted with co-axial hollow trunnions 25 and 26 respectively. The said trunnions are mounted on pedestal bearings 27 at either side and the said dryer is capable of being rotated by gear wheel 30 fast with trunnion 26. Stationary conduits 28 and 29 are aligned with the said trunnions 25 and 26 and pass through a gland and stuffing box 31 provided at each side to procure a fluid tight joint between the stationary and rotary conduit parts. Steam for heating the dryer jacket and steam tubes is admitted from a steam line 32 through valve 33, whilst live low pressure steam for treating the grain in the interior of the dryer is introduced to the trunnion 26 by multiple head static conduit 28 through valve 34. The trunnion 26 passes through the dished cover 24, tube header plate 35 and communicates with a series of connected gauze covered passages contacting the grains within the dryer. The static conduit header 28 is also connected to a wet vacuum pump 13 capable of valve isolation as at 36 and 42, and said conduit header 28 is also fitted with a blow-off conduit 37 fitted with a quick release gate valve 38. The grain after being steamed and the steam suddenly blown off is dried, the dryer 22 being revolved under speed control during this conversion operation, and finally when the grain material passing through the sampling cocks is sufficiently dehydrated the dryer is arrested with its covers below which latter are then opened causing the grain to descend to the hoppers 40 from whence it is removed by a conveyor 41 or like device for storage or milling.

In order to withdraw the steeping water, when so required, the base of the steeping tank 6 and, if desired, of the enzyme tank 18 is provided with a draining collar 17. This consists of a two compartment device, the grain conduit 50 is separated from the water drainage channel by a perforated sleeve 51, leaving an annular space within the collar which communicates on one or either side with drainage pipes 52 closable by valves 53, see Fig. 3.

In Fig. 2 a multiple compartment rotary set of enzyme reaction chambers 18 are shown. These chambers are mounted on a circular rail 55 which latter is carried by rollers 56. The series of chambers may be rotated to bring each one or each pair under the chutes 20 of the steeping tank. In this manner a series of steeping operations may be consecutively subjected to a prolonged enzymic action.

The operation of the process and plant constituting the invention is as follows:

The weighed batch charge of grain enters the steeping tank 6 and the vessel is closed, and its contents subjected to the influence of vacuum from the pump 13, the valves 14 and 36 being opened, and valves 34, 38 and 42 being closed. The vacuum should be as high as possible and even higher than 29½ inches of mercury with the barometer at 30. This has the effect of deaerating the grain and in the case of paddy rice also the husk. When the desired absence of pressure has been reached warm steeping water varying from 40° C. to 70° C. is admitted from the tank 9 by conduit 10 through valve 11 or through valve 53 until the water gauge 6a indicates that the whole of the grain in the tank 6 is submerged. During the water filling operation and for a short period thereafter the vacuum is maintained until the vacuum pump re-establishes the same indication as at the commencement of filling. During this period the temperature of the steeping water may have fallen, and after closing the vacuum valves 14 and 36 the desired temperature is maintained by admission of live steam by the pipe 16, or by admitting additional hot water. The temperature of the water for steeping depends upon the size, maturity and type of grain treated. Thus, in wheat to be used for making bread flour, the temperature should not substantially exceed 40° C. but in the case of paddy a convenient temperature is 60° to 65° C.; obviously, however, the operator can adjust the temperature to the requirements of the enzymic reaction required to that most latent in the grain. During the steeping process compressed air up to 100 lbs. per square inch may be admitted, and during the steeping process which lasts for about an hour or two the soluble vitamins and salts of the grain go into solution and are most readily absorbed by the starch of the endosperm of the grain. During such steeping process the grain swells and takes up to about 30% to 30% of vitamin-laden water over and above the normal dry weight of the grain taken at say 12%. When steeping is concluded the drain valves 53 are opened and the remaining steeping water drawn off, stored and reused for a second batch. The wet grain may now be left in the steeping tank 6 for enzyme reaction to take place, or it is dropped into one of the enzyme chambers 18, where the temperature at which the grain leaves tank 6 is substantially maintained. Natural enzyme reaction takes several hours depending upon the grain and therefore to keep such a batch process cyclic a multiple series of enzyme tanks may be employed as shown in Fig. 2.

To accelerate enzymotic action diastase or other enzyme bodies may be added to the grain or to the liquid prior to steeping or alternatively by allowing the steeping water to be discharged with the grain to the enzyme chamber. The pH of the grain is tested from time to time and maintained preferably at neutral.

If it is desired to accelerate the enzyme action, the pH may be lowered up to a point not greater than 4.5, and this acceleration process may also be accompanied by maintaining the grain at that temperature which a prior trial test has shown to give the best results.

When the desired degrees of enzymic action are completed the grain is introduced to the digester dryer 22. In this vessel live steam at a high rate of flow is introduced through steam valve 34, which is closed when a gauge pressure of between 5 and 10 lbs. has been built up in the dryer and when the grain has, throughout its mass, acquired the temperature equivalent to the chosen pressure at this point the blow off valve 38 is suddenly opened causing the steam vapor suddenly to discharge and reduce to atmospheric pressure in a period of a few seconds and thereby entrain any volatile aroma or ethereal product latent in or promoted by the prior treatment. The valve 38 is then closed and drying under vacuum ensues in a known manner. The dryer is slowly revolved during the drying process and also during the prior steaming treatment. Drying may be carried to a degree to give a tempered grain for surface milling and the resultant product after its final passage through the mill is translucent, free of white or unconverted starch, is tough and insect resistant, of even colour and contains as milled whole grain up to 80% of the vitamin content of the raw material. When converting grain for the purpose of making baking flour, the steaming step is omitted.

Although the above process has been described as taking place in vessels wherein more than one operation is performed, it is obvious that separate vessels may be employed for steeping, enzyme reaction, converting and drying. Alternatively the whole of the operation can be conducted in one vessel, but since large quantities of material have frequently to be dealt with the process is made cyclic for maximum production. Cyclic operation is desirable for plants dealing with 15,000 to say 100,000 tons per annum.

In respect to the enzymes referred to in the preceding text, these are of the following types, some occurring in all of the cereals, which are the subject of this application and others appearing only in one or several of such cereals:

Diastase (amylase).
Glucosido-saccharases
Fructosido-saccharases
Glucosido-maltase
Gluco-maltase
The phosphatases
Lactase
Pipase
Cellulase
Papain
Cytases and pectinases
Some nucleases
Some amidases
Lecithinase B
Catalases, oxidases and peroxidase
Glyoxalase
Dehydrogenases
The cytochromes
Some depeptidases The temperature optimum (namely the point of balance between the accelerating effect of temperature upon a reaction catalyzed by an enzyme and the effect of destruction of the enzyme by heat) is usually between 50 and 60° C.; a temperature of 80° C. irreversibly destroys nearly all enzymes. Thus, when it is desired to accelerate the reactions catalyzed by the multiplicity of enzymes present in seeds and the like the processing temperature should be kept above about 40 or 45° C. and below 80° C.

If, however, it is desired to accelerate the reaction catalyzed by one or the other preferred enzyme, then the temperature optimum for such preferred enzyme is determinable by the empirical equation of S. Arrhenius, which is known to anyone versed in the art.

The pH-optimum for most plant enzymes lies between 6 and 7, but if it is desired to particularly accelerate the reaction catalyzed by amylase, the pH should be lowered to 5 or 4.5.

We claim:

1. That method of enriching the endosperm of cereal grain comprising the steps of removing entrained air from the voids and capillary spaces of said grain by subjecting it to a high vacuum treatment, steeping said grain under superatmospheric pressure in a warm aqueous extract of enriching material from the group consisting of grain and grain offals to introduce the enriching material into the endosperm, said steeping step being conducted at a temperature below 80° C. so that the natural enzymes of the grain are not destroyed, separating the extract from the grain, maintaining the grain at a temperature between 40° C. and 80° C. and at a pH value between 4.5 and 7 for several hours to permit enzymic reaction to occur in the grain, treating said grain with live steam under pressure, suddenly releasing said steam at a high rate of flow, and drying said grain.

2. That method of enriching the endosperm of cereal grain comprising the steps of removing entrained air from the voids and capillary spaces of said grain by subjecting it to a high vacuum treatment, steeping said grain under superatmospheric pressure in a warm aqueous extract of enriching material from the group consisting of grain and grain offals to introduce the enriching material with the endosperm, said steeping step being conducted under conditions which do not destroy the natural enzymes of the grain, separating the extract from the grain, maintaining the grain for several hours at a temperature between 40° C. and 80° C. and at a pH value between 4.5 and 7 while permitting substantial enzymic reaction to occur in the grain, treating said grain with live steam under pressure, suddenly releasing said steam at a high rate of flow, and drying said grain.

3. That method of enriching the endosperm of cereal grain comprising the steps of steeping said grain under pressure in a warm aqueous extract of enriching material from the group consisting of grain and grain offals to introduce the enriching material into the endosperm, said steeping step being conducted under conditions which do not destroy the natural enzymes of the grain, separating the extract from the grain, maintaining the grain at a temperature between 40° C. and 80° C. and at a pH value between 4.5 and 7 for several hours to permit substantial enzymic reaction to occur in the grain, treating said grain with live steam under pressure, suddenly releasing said steam at a high rate of flow, and drying said grain.

4. That method of enriching the endosperm of cereal grain comprising the steps of removing entrained air from the voids and capillary spaces of said grain by subjecting it to a high vacuum treatment, steeping said grain in a warm aqueous extract of enriching material from the group consisting of grain and grain offals to introduce the enriching material into the endosperm, said steeping step being conducted under conditions which do not destroy the natural enzymes of the grain, separating the extract from the grain, maintaining the grain for several hours at a temperature between 40° C. and 80° C. and at a pH value between 4.5 and 7 while permitting substantial enzymic reaction to occur in the grain, treating said grain with live steam under pressure, and drying said grain.

5. That method of enriching the endosperm of cereal grain comprising the steps of removing entrained air from the voids and capillary spaces of said grain by subjecting it to a high vacuum treatment, steeping said grain under pressure in a warm aqueous extract of enriching material from the group consisting of grain and grain offals to introduce the enriching material into the endosperm, said steeping step being conducted under conditions which do not destroy the natural enzymes of the grain, separating the extract from the grain, maintaining the grain at a temperature below 80° C. and at a pH value between 4.5 and 7 for a period of several hours to permit substantial enzymic reaction to occur in the grain, treating said grain with live steam under pressure, suddenly releasing said steam at a high rate of flow, and drying said grain.

6. That method of enriching the endosperm of cereal grain comprising the steps of removing entrained air from the voids and capillary spaces of said grain by subjecting it to a high vacuum treatment, steeping said grain under pressure in a warm aqueous extract of enriching material from the group consisting of grain and grain offals to introduce the enriching material into the endosperm, said steeping step being conducted under conditions which do not destroy the natural enzymes of the grain, separating the extract from the grain, maintaining the grain for several hours at a temperature between 40° C. and 80° C. while permitting substantial enzymic reaction to occur in the grain, treating said grain with live steam under pressure, suddenly releasing said steam at a high rate of flow, and drying said grain.

7. That method of enriching the endosperm of cereal grain comprising the steps of steeping said grain in a warm aqueous extract of enriching material from the group consisting of grain and grain offals to introduce the enriching material into the endosperm, said steeping step being conducted under conditions which do not destroy the natural enzymes of the grain, separating the extract from the grain, maintaining the grain at a temperature between 40° C. and 80° C. and at a pH value between 4.5 and 7 for a period of time of several hours to permit substantial enzymic reaction to occur in the grain, and drying said grain.

8. That method of enriching the endosperm of cereal grain comprising the steps of steeping said grain under superatmospheric pressure in a warm aqueous extract of enriching material from the group consisting of grain and grain offals to introduce the enriching material into the endosperm, said steeping step being conducted under conditions which do not destroy the natural enzymes of the grain, separating the extract from the grain, maintaining the grain for several hours at a temperature between 40° C. and 80° C. and at a pH value between 4.5 and 7 while permitting substantial enzymic reaction to occur in the grain, and rendering said enzymes inactive.

9. That method of treating cereal grain comprising the steps of steeping said grain in warm water under pressure and below a temperature of 80° C. to increase the moisture content of said grain, separating said grain and water, maintaining the grain for several hours under conditions to promote substantial enzymic reaction in said grain, treating said grain with live steam under pressure to complete gelatinization of starch in said grain, and drying said grain.

10. That method of treating cereal grain comprising the steps of steeping said grain in warm water under pressure and below a temperature of 80° C. to increase the moisture content of said grain, separating said grain and water, maintaining the grain for several hours under conditions to promote substantial enzymic reaction in said grain, and drying said grain.

11. That method of treating cereal grain comprising the steps of steeping said grain in warm water under pressure and below a temperature of 80° C. to increase the moisture content of said grain, maintaining the grain for several hours at a temperature between 40° C. and 80° C. while permitting substantial enzymic reaction in said grain, treating said grain with live steam under pressure to complete gelatinization of starch in said grain, and drying said grain.

ERICH GUSTAV HUZENLAUB.
FRANCIS HERON ROGERS.

REFERENCES CITED

The following references are of record in the file of this patent:

UNITED STATES PATENTS

| Number | Name | Date |
|---|---|---|
| 797,144 | Nickerson | Aug. 15, 1905 |
| 1,471,423 | Smith | Oct. 23, 1923 |
| 1,607,892 | Hunt | Nov. 23, 1926 |
| 1,839,917 | Ferguson | Jan. 5, 1932 |
| 1,910,241 | Chapman | May 23, 1933 |
| 2,287,737 | Huzenlaub | June 23, 1942 |
| 2,289,727 | Randolph | July 14, 1942 |
| 2,358,250 | Rogers | Sept. 12, 1944 |

FOREIGN PATENTS

| Number | Country | Date |
|---|---|---|
| 538,437 | Great Britain | Aug. 5, 1941 |

OTHER REFERENCES

Kent-Jones: Modern Cereal Chemistry, 1939, Northern Pub. Co., Liverpool, pp. 24, 25.

Winton: Structure and Composition of Foods, vol. I, p. 151.

Winton: Structure and Composition of Foods, vol. I, John Wiley and Sons, Inc., New York, 1932, pages 236–238.